US011975793B2

(12) United States Patent
Halfer

(10) Patent No.: US 11,975,793 B2
(45) Date of Patent: May 7, 2024

(54) MOTORCYCLE HAVING A TENSIONING DEVICE FOR TENSIONING A PULLING MEMBER, AND TENSIONING DEVICE FOR A MOTORCYCLE

(71) Applicant: Bayerische Motoren Werke Aktiengesellschaft, Munich (DE)

(72) Inventor: Matthias Halfer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 422 days.

(21) Appl. No.: 17/275,002

(22) PCT Filed: Aug. 7, 2019

(86) PCT No.: PCT/EP2019/071190
§ 371 (c)(1),
(2) Date: Mar. 10, 2021

(87) PCT Pub. No.: WO2020/052865
PCT Pub. Date: Mar. 19, 2020

(65) Prior Publication Data
US 2022/0055713 A1  Feb. 24, 2022

(30) Foreign Application Priority Data
Sep. 11, 2018 (DE) .................... 10 2018 215 451.1

(51) Int. Cl.
*B62K 25/28* (2006.01)
*B62K 11/00* (2006.01)
(Continued)

(52) U.S. Cl.
CPC ............ *B62K 25/283* (2013.01); *B62K 11/00* (2013.01); *B62M 9/16* (2013.01); *F16H 7/08* (2013.01);
(Continued)

(58) Field of Classification Search
CPC ..... F16H 7/00; F16H 7/02; F16H 7/08; F16H 2007/0802; F16H 2007/0806;
(Continued)

(56) References Cited

U.S. PATENT DOCUMENTS 611,170 A  *  9/1898  Howard ................ F16H 7/1281
474/134
976,115 A  *  11/1910  Bard ............................ 180/443
(Continued)

FOREIGN PATENT DOCUMENTS

CN          2859091 Y  *  1/2007  ..... F16H 2007/0874
CN        105452720 A      3/2016
(Continued)

OTHER PUBLICATIONS

DE102010010834A1 Translation; Clamping Device For Aggregate Drive At Machine; Batzill et al.; Published on: Sep. 15, 2011; Published By: Espacenet (Year: 2011).*

(Continued)

*Primary Examiner* — Michael R Mansen
*Assistant Examiner* — Raveen J Dias
(74) *Attorney, Agent, or Firm* — Crowell & Moring LLP

(57) ABSTRACT

A motorcycle with a swing arm element pivotably coupled to a holding element of the motorcycle via a rotary bearing is provided with a tensioning element. The motorcycle also includes a pulling member which engages two gear elements which are each spaced from the rotary bearing in a torque-transmitting manner. The first gear element is rotatably mounted separately from the swing arm element, and the second gear element is rotatably mounted on the swing arm element. The tensioning device for tensioning the pulling member is mounted rotatably and/or in an axially displaceable manner relative to the two gear elements on the swing arm element or on a frame of the motorcycle. The tensioning
(Continued)

device includes at least two levers pivotable relative to one another, and a tensioning element which biases the levers against the pulling member to maintain consistent tension in the pulling member.

12 Claims, 2 Drawing Sheets

(51) Int. Cl.
*B62M 9/16* (2006.01)
*F16H 7/08* (2006.01)

(52) U.S. Cl.
CPC ............... *F16H 2007/0806* (2013.01); *F16H 2007/0808* (2013.01); *F16H 2007/0865* (2013.01); *F16H 2007/0874* (2013.01); *F16H 2007/0893* (2013.01); *F16H 2007/0895* (2013.01); *F16H 2007/0897* (2013.01)

(58) Field of Classification Search
CPC ....... F16H 2007/0808; F16H 2007/081; F16H 2007/0863; F16H 2007/0865; F16H 2007/0874; F16H 2007/0893; F16H 2007/0842; F16H 2007/0844; F16H 2007/087; F16H 7/18; F16H 2007/185; B62M 9/00; B62M 9/06; B62M 9/16; B62M 7/00; B62M 7/02; B62M 7/04; B62M 7/06; B62M 6/00; B62M 6/10; B62M 6/25; B62M 6/30; B62M 6/40; B62M 6/55; B62M 6/70; B62K 25/28; B62K 25/283; B62K 11/00; B62K 11/04; B62K 11/10
See application file for complete search history.

(56) References Cited

U.S. PATENT DOCUMENTS

| | | | | |
|---|---|---|---|---|
| 3,811,332 | A * | 5/1974 | Brown | F16H 7/08 474/111 |
| 3,834,246 | A * | 9/1974 | McGilp | F16H 7/1281 474/135 |
| 3,838,606 | A * | 10/1974 | Scalise | B62M 9/16 474/111 |
| 4,034,821 | A * | 7/1977 | Stoddard | B62M 9/16 474/134 |
| 4,036,069 | A * | 7/1977 | Clark | B62M 9/16 474/135 |
| 4,069,719 | A * | 1/1978 | Cancilla | B62M 9/16 474/134 |
| 4,141,245 | A * | 2/1979 | Brandstetter | G01L 5/107 474/134 |
| 4,237,744 | A * | 12/1980 | Jolly | B62M 9/16 180/231 |
| 4,299,582 | A * | 11/1981 | Leitner | B62M 9/16 474/111 |
| 4,416,647 | A * | 11/1983 | White, Jr. | F16H 7/1281 474/134 |
| 4,705,494 | A * | 11/1987 | Gibson | F16H 7/18 474/148 |
| 5,221,236 | A * | 6/1993 | Raymer | B62M 9/16 474/134 |
| 5,282,517 | A * | 2/1994 | Prince | B62K 25/26 180/219 |
| 5,908,078 | A * | 6/1999 | Belil Creixell | B62K 25/16 280/285 |
| 5,957,794 | A * | 9/1999 | Kerr | F16H 9/24 474/122 |
| 6,167,686 | B1 * | 1/2001 | Becker | F16H 7/1281 56/17.3 |
| 6,189,639 | B1 * | 2/2001 | Fuse | B62M 21/00 474/135 |
| 6,406,393 | B1 * | 6/2002 | Chen | F16H 7/1281 474/135 |
| 6,689,001 | B2 * | 2/2004 | Oliver | F16H 7/1281 474/134 |
| 6,866,112 | B2 * | 3/2005 | Hoechst | B62M 9/16 180/231 |
| 6,960,145 | B2 * | 11/2005 | Fraley, Jr. | F16H 7/1281 474/134 |
| 8,695,680 | B2 * | 4/2014 | Cannaverde | F16H 7/1281 160/307 |
| 9,133,762 | B2 * | 9/2015 | Maguire | F02B 67/06 |
| 9,581,224 | B1 * | 2/2017 | Anderfaas | F16H 7/1281 |
| 10,634,110 | B2 * | 4/2020 | Allard | F02P 5/16 |
| 11,142,284 | B2 * | 10/2021 | Lund | B62M 6/70 |
| 2001/0004150 | A1 * | 6/2001 | Murayama | B62K 15/008 280/287 |
| 2002/0043416 | A1 * | 4/2002 | Hoechst | B62M 9/16 180/231 |
| 2003/0224889 | A1 * | 12/2003 | Luh | F16H 7/1281 474/134 |
| 2005/0181901 | A1 * | 8/2005 | Shin | F16H 7/1218 474/134 |
| 2011/0070986 | A1 * | 3/2011 | Maguire | F16H 7/1281 474/135 |
| 2012/0160630 | A1 * | 6/2012 | Cannaverde | E06B 9/90 160/321 |
| 2014/0357437 | A1 | 12/2014 | Hara | |
| 2016/0297497 | A1 * | 10/2016 | Nolin | B62K 5/027 |
| 2017/0307060 | A1 * | 10/2017 | Klein | F16H 57/01 |
| 2019/0071286 | A1 * | 3/2019 | Dong | F16H 7/08 |
| 2019/0301420 | A1 * | 10/2019 | Allard | F16H 7/08 |

FOREIGN PATENT DOCUMENTS

| | | | | |
|---|---|---|---|---|
| DE | 202005002842 | U1 * | 6/2005 | ............. B62M 9/16 |
| DE | 10 2010 010 834 | A1 | 9/2011 | |
| DE | 102020106772 | A1 * | 9/2021 | ............... F16H 7/12 |
| EP | 3913256 | A1 * | 11/2021 | ............... F16H 7/08 |
| FR | 2882581 | A3 * | 9/2006 | ............... B62M 9/16 |
| GB | 2232456 | A * | 12/1990 | ............... F16H 7/12 |
| KR | 0134456 | Y1 * | 2/1999 | ............... F16H 7/08 |
| SU | 1013660 | A1 * | 4/1983 | ....... F16H 2007/087 |
| WO | WO-2005012765 | A1 * | 2/2005 | ............ F16H 7/1209 |
| WO | WO-2020157457 | A1 * | 8/2020 | ............... F16H 7/06 |

OTHER PUBLICATIONS

International Search Report (PCT/ISA/210) issued in PCT Application No. PCT/EP2019/071190 dated Oct. 7, 2019 with English translation (five (5) pages).

German-language Written Opinion (PCT/ISA/237) issued in PCT Application No. PCT/EP2019/071190 dated Oct. 7, 2019 (three (3) pages).

German-language Search Report issued in German Application No. 10 2018 215 451.1 dated Jul. 23, 2019 with partial English translation (13 pages).

Chinese-language Office Action issued in Chinese Application No. 201980055440.8 dated Sep. 27, 2021 with English translation (13 pages).

* cited by examiner

MOTORCYCLE HAVING A TENSIONING DEVICE FOR TENSIONING A PULLING MEMBER, AND TENSIONING DEVICE FOR A MOTORCYCLE

BACKGROUND AND SUMMARY OF THE INVENTION

The invention relates to a motorcycle having at least one swinging fork element (coupled pivotably to a holding element of the motorcycle. A further aspect of the invention relates to a tensioning device for a motorcycle.

In order to transmit driving power or torque to a drive wheel of a motorcycle, use is made of pulling members which can be in the form, for example, of belts or chains. The pulling members are frequently arranged in the region of what is referred to as a swinging fork of the motorcycle and can couple a gear wheel assigned to the drive wheel and a pinion driven at least indirectly by a drive motor of the motorcycle to each other. By means of such pulling members, power can be transmitted or torque can be transmitted between gear wheel and pinion even in the event of pronounced pivoting movements of the swinging fork, which may occur, for example, when riding over uneven ground when riding the motorcycle.

US 2002/0043416 A1 discloses a motorcycle which comprises a frame, and a motor and a transmission, which are mounted on the frame. A swinging fork is mounted pivotably on the frame, and a rear wheel is mounted rotatably on the swinging fork. An output shaft of the transmission is coupled to the rear wheel in order to bring about a rotation of the rear wheel under the force of the motor. A stationary tensioner is attached to the frame in such a manner that, when the rear wheel jumps up and down with respect to the frame, the tensioner maintains a substantially constant tension and belt travel displacement length in a belt without the tensioner having to move in a translatory movement or pivoting direction.

It is the object of the invention to provide a motorcycle and a tensioning device of the type mentioned at the beginning which permit a low-cost transmission of drive power and a virtually uniform pretensioning of a pulling member.

A first aspect of the invention relates to a motorcycle. The motorcycle comprises at least one swinging fork element which is coupled pivotably to a holding element of the motorcycle via a rotary bearing of the motorcycle. Furthermore, the motorcycle comprises at least one pulling member, and at least two gear elements which are each spaced apart from the rotary bearing and of which a first gear element is mounted rotatably separately from the swinging fork element and a second gear element is arranged rotatably on the swinging fork element and which are each in engagement with the at least one pulling member and are coupled in a torque-transmitting manner to one another via the at least one pulling member. In addition, the motorcycle comprises at least one tensioning device for tensioning the at least one pulling member. The holding element can be in the form, for example, of a frame element, i.e. part of a frame, of the motorcycle. The at least two gear elements can be in the form of respective gear wheels. A first gear element of the at least two gear elements can be in the form, for example, of a pinion and can be coupled at least indirectly to a drive motor of the motorcycle. The first gear element can be coupled, for example, to the drive motor by means of a transmission of the motorcycle. A second gear element of the at least two gear elements can be coupled at least indirectly to a drive wheel, in particular rear wheel, of the motorcycle.

The swinging fork element may in general also be referred to as a swinging fork or rotary swinging fork.

According to the invention, the tensioning device is mounted on the at least one swinging fork element or on a frame of the motorcycle and so as to be rotatable and/or axially displaceable relative to the at least two gear elements. This is of advantage since the tensioning device because of being mounted on the swinging fork element can oscillate with the swinging fork element, i.e., for example, can like the swinging fork element compress and rebound in different directions when riding over uneven ground. By this means, the tensioning device can be mounted rotatably on the swinging fork element with an axial offset with respect to the at least two gear elements, thus enabling an existing construction space to be particularly readily used. The tensioning device can be mounted, for example, between the at least two gear elements on the swinging fork element, thus enabling particularly good use of construction space. In a particularly advantageous refinement, the tensioning device can be mounted between the at least two gear elements on the swinging fork element in such a manner that the pulling member circumferentially surrounds a bearing position of the tensioning device. An existing construction space can thereby be particularly readily utilized. Even in the event of mounting the tensioning device on the frame of the motorcycle, particularly good use of the existing construction space is made possible.

Owing to the fact that the first gear element is mounted rotatably separately from the swinging fork element and the second gear element is arranged rotatably on the swinging fork element, a complicated, concentric mounting of the swinging fork element and of the first gear element can be dispensed with. The mounting of the first gear element separate from the swinging fork element while simultaneously mounting the second gear element on the swinging fork element instead permits a low-cost transmission of drive power. However, respective distances between a first bearing point of the first gear element and the rotary bearing and between the first bearing point and a second bearing point of the second gear element can change during pivoting movements of the swinging fork element induced by the travel mode. However, the rotatable mounting of the tensioning device on the swinging fork element advantageously permits a virtually uniform tension at the pulling member despite the change in said distances induced by the travel mode.

Thus, the mounting of the first gear element separate from the swinging fork element and the rotatable mounting of the second gear element on the swinging fork element overall permits a low-cost transmission of drive power and, the tensioning device mounted rotatably on the swinging fork element permits a virtually uniform pretensioning of the pulling member.

The invention is based on the finding that a coaxial arrangement of the rotary bearing and of the first bearing point of the first gear element does indeed permit a simplified maintaining of a pretensioning of the pulling element, but can be achieved only by an increased structural outlay and requires a particularly large amount of construction space, in particular in the transverse direction of the motorcycle. By means of the tensioning device and the rotatable arrangement thereof on the swinging fork element or on the frame of the motorcycle, such a structurally complicated, coaxial arrangement can be dispensed with and instead the first bearing point can be arranged separately from the swinging fork element at low cost and saving on construction space. At the same time, a virtually uniform pretensioning of the pulling member can be ensured by the tensioning device and the mounting thereof on the swinging fork element.

In an advantageous development of the invention, the tensioning device comprises at least two tensioning levers which are movable relative to one another, and at least one spring element via which the at least two tensioning levers are acted upon with a spring force and are thereby braced in relation to the at least one pulling member. This is of advantage since a particularly uniform tensioning of the pulling member can be ensured by the tensioning levers and the spring element. An effective pretensioning of the pulling member can thus take place even without a complicated torque support (for example via a torsion spring) of the tensioning levers on the swinging fork element.

In a further advantageous development of the invention, the tensioning device comprises at least two tensioning pulleys for tensioning the pulling member, of which in each case one tensioning pulley is connected rotatably to in each case one of the at least two tensioning levers, wherein the at least two tensioning pulleys between the at least two gear elements are in engagement with the at least one pulling member and are mounted rotatably on the swinging fork element or on the frame of the motorcycle via the at least two tensioning levers. This is of advantage since a particularly low-friction pretensioning of the pulling member is made possible by the tensioning pulleys. Both the pulling member and the tensioning pulleys can have respective toothings corresponding to one another such that a particularly low-wear and at least substantially slip-free rolling of the tensioning pulleys on the pulling member is made possible.

It is particularly advantageous here if one tensioning pulley of the at least two tensioning pulleys is supported on a load side of the pulling member and another tensioning pulley of the at least two tensioning pulleys is supported on a slack side of the pulling member. As a result, an effective pretensioning of the pulling member can take place even without a complicated torque support of the tensioning levers on the swinging fork element.

In a further advantageous development of the invention, the at least one spring element presses the at least two tensioning pulleys by means of the at least two tensioning levers onto an outer side of the pulling member, which outer side faces away from the at least two gear elements. This is of advantage since the pulling member can thus be braced between the tensioning pulleys, as a result of which a particularly large wrap angle by which the pulling member can wrap around at least one of the gear elements can be set on account of the tensioning pulleys. A larger wrap angle permits a greater transmission of pulling force and greater security against skipping or slipping of the pulling member between the respective gear element and the pulling member.

The pulling member can preferably also be guided between the at least two tensioning levers in a direction oriented parallel to a pivot axis of the swinging fork element. Lateral guidance of the pulling member between the two tensioning levers can thereby be made possible. For example, in the event of an unforeseen, accident-induced, lateral action of force on the pulling member, the two tensioning levers can thus counteract a possible, undesired lateral sliding off or slipping down of the pulling member from one of the gear elements.

In a further advantageous development of the invention, the at least one spring element presses the at least two tensioning pulleys by means of the at least two tensioning levers onto an inner side of the pulling member, at which inner side the pulling member is in engagement with the at least two gear elements. This is of advantage since the tensioning pulleys can thus be arranged facing the inner side of the pulling member in a manner saving particularly on construction space.

In a further advantageous development of the invention, the at least two tensioning levers are mounted pivotably relative to one another or are mounted so as to be displaceable in a translatory manner relative to one another. By means of the pivotable mounting of the tensioning levers relative to one another, the pretensioning at the pulling member can be maintained in a particularly simple manner even in the event of possible load changes at the pulling member, which load changes may occur, for example, during switching between a drag state and a drive state. The at least two tensioning levers can be mounted so as to be displaceable in a translatory manner relative to one another by the two tensioning levers forming, for example, a linearly movable slide. The mounting so as to be displaceable in a translatory manner requires particularly little construction space.

In a further advantageous development of the invention, at least one tensioning lever of the at least two tensioning levers has at least two lever regions which are connected to one another at a connecting region and enclose an angle with one another. This is of advantage since a scissors-like arrangement of the at least two tensioning levers is made possible by the lever regions enclosing the angle with one another, and therefore, for example, a particularly cost-effective helical spring can be used as the spring element for exerting the spring force.

The at least two lever regions can preferably differ in length. Force can thereby be transmitted in a particularly simple manner by the spring element acting on one of the lever regions and the pulling member being braced via the other lever region.

In a further advantageous development of the invention, the at least one tensioning lever of the at least two tensioning levers is mounted rotatably at the connecting region, and the at least one spring element is connected to the at least one tensioning lever at one of the at least two lever regions and at a distance from the connecting region. This is of advantage since the spring force can thereby be transmitted particularly advantageously.

In a further advantageous development of the invention, the at least one spring element is in the form of a helical spring. This is of advantage since such a helical spring can be produced at particularly low cost and is accordingly cost-effective.

In a further advantageous development of the invention, the at least one spring element is in the form of a torsion spring. This is of advantage since such a torsion spring can be arranged in a particularly space-saving manner. The torsion spring may also be referred to as a leg spring. Alternatively, it is also conceivable to use a bow spring, a curved leaf spring or a curved round wire spring as the spring element.

In a further advantageous development of the invention, the at least one pulling member is in the form of a belt. This is of advantage since such a belt requires particularly little construction space and in addition is particularly maintenance-friendly.

The pulling member can preferably be in the form of a toothed belt, thus permitting transmission of particularly large torques.

A second aspect of the invention relates to a tensioning device for a motorcycle according to the first aspect of the invention. The tensioning device permits a low-cost transmission of drive power and a virtually uniform pretensioning of a pulling member.

The features presented in conjunction with the motorcycle according to the invention according to the first aspect of the invention and the advantages of said features apply correspondingly to the tensioning device according to the invention according to the second aspect of the invention, and vice versa.

Further features of the invention emerge from the claims, the figures and the description of the figures. The features and feature combinations mentioned above in the description and also the features and feature combinations mentioned below in the description of the figures and/or shown solely in the figures can be used not only in the respectively stated combination, but also in different combinations or on their own.

The invention will now be explained in more detail using a preferred exemplary embodiment and with reference to the drawings.

DETAILED DESCRIPTION OF THE DRAWINGS

Figure 1:
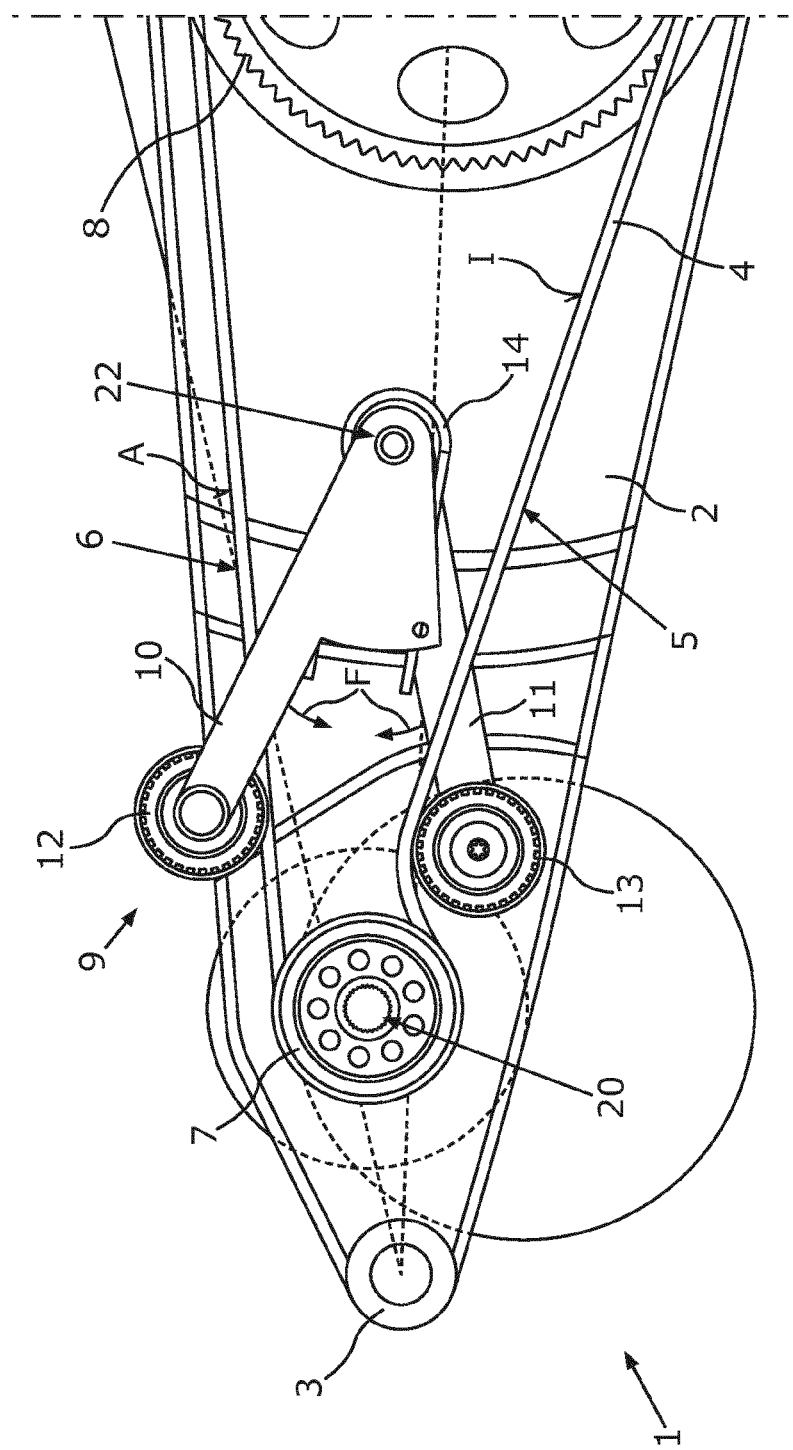
FIG. 1 shows a schematic side view of a partial region of a motorcycle in accordance with an embodiment of the present invention, showing a swinging fork element, a pulling member, a variant of a tensioning device for tensioning the pulling member, and two gear elements which are each in engagement with the pulling member.
Figure 2:
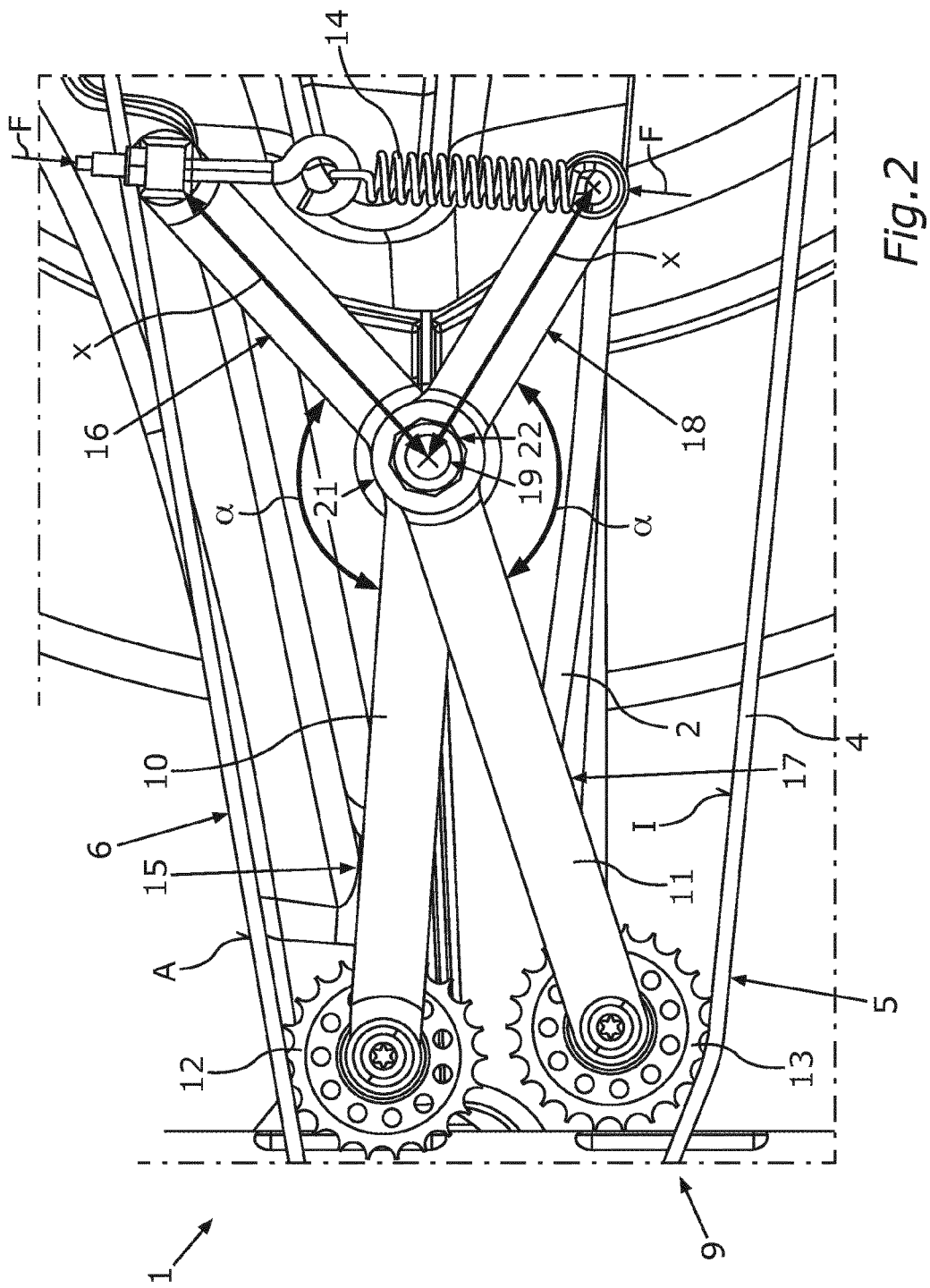
FIG. 2 shows a schematic side view of the partial region of the motorcycle in accordance with another embodiment of the present invention, showing a further variant of the tensioning device.

FIG. 1 and FIG. 2 each show a partial region of a motorcycle 1 in a schematic side view.

The motorcycle 1 comprises a swinging fork element 2 which is coupled pivotably to a holding element (not shown further here) of the motorcycle 1 via a rotary bearing 3 of the motorcycle 1. The rotary bearing 3 forms a pivot axis of the swinging fork element 2, the pivot axis being oriented here perpendicularly to the plane of the drawing. The swinging fork element 2 can pivot about the pivot axis formed by the rotary bearing 3. The holding element can be in the form, for example, of a frame element of the motorcycle 1. Furthermore, the motorcycle 1 comprises a pulling member 4 which is in the form here of a belt.

Furthermore, the motorcycle 1 comprises two gear elements 7, 8 which are each spaced apart from the rotary bearing 3. A first gear element 7 of the two gear elements 7, 8 is mounted rotatably here separately from the swinging fork element 2 at a first bearing point 20. The first bearing point 20 can be assigned to a motor housing or to a transmission housing of the motorcycle 1, to mention only some examples. A second gear element 8 of the two gear elements 7, 8 is arranged here rotatably on the swinging fork element 2 at a second bearing point, not shown further here.

The first gear element 7 and the second gear element 8 are each in engagement with the at least one pulling member 4 and are coupled to one another in a torque-transmitting manner via the pulling member 4 (belt). The first gear element 7 is in the form here of a belt pinion and can be driven at least indirectly by a drive motor (not illustrated further here) of the motorcycle 1. The drive motor can be configured, for example, as an internal combustion engine or as an electric motor. Accordingly, a drive moment or drive power can be transmitted to the second gear element 8 via the first gear element 7 (and the pulling member 4). The second gear element 8 can be coupled to a drive wheel (not illustrated further here) configured as a rear wheel of the motorcycle 1. During the transmission of torque or transmission of power using the first gear element 7, force is transmitted via a load side 6 of the pulling member 4, and therefore the load side 6, as shown in FIG. 1, is tensioned more greatly than a slack side 5 of the pulling member 4.

In order to avoid too low a tensioning of the pulling member 4, the motorcycle 1 has a tensioning device 9 for tensioning the at least one pulling member 4. The tensioning device 9 is mounted on the swinging fork element 2 at a bearing position 22 and so as to be rotatable and/or axially displaceable relative to the two gear elements 7, 8. Alternatively thereto, the tensioning device 9 could also be mounted on a frame of the motorcycle 1 so as to be rotatable and/or axially displaceable, but this is not shown further here. The tensioning device 9 is mounted here between the two gear elements 7, 8 on the swinging fork element 2 in such a manner that the pulling member 4 circumferentially surrounds the bearing position 22 of the tensioning device 9. This results in a particularly space-saving arrangement.

The tensioning device 9 comprises two tensioning levers 10, 11 which are movable, in particular pivotable, relative to one another. Furthermore, the tensioning device 9 shown in FIG. 1 comprises a spring element 14 which is in the form of a leg spring and via which the two tensioning levers 10, 11 are acted upon with a spring force F and are thereby braced in relation to the at least one pulling member 4. The spring element 14 is coupled to the two tensioning levers 10, 11 in order to exert the spring force on the two tensioning levers 10, 11. The spring element 14 can generally be in the form, for example, of a helical spring or of a torsion spring.

As shown in FIG. 1 and FIG. 2, the two tensioning levers 10, 11 can be mounted pivotably relative to one another. Alternatively thereto, the tensioning levers 10, 11 can also be mounted so as to be displaceable in a translatory manner relative to one another, but this is not shown further here.

Furthermore, the tensioning device 9 comprises two tensioning pulleys 12, 13 for tensioning the pulling member 4, of which a first tensioning pulley 12 is connected rotatably to a first tensioning lever 10 of the tensioning levers 10, 11 and of which a second tensioning pulley 13 is connected rotatably to a second tensioning lever 11 of the tensioning levers 10, 11.

The two tensioning pulleys 12, 13 are in engagement here between the at least two gear elements 7, 8 with the at least one pulling member 4, wherein the tensioning pulleys 12, 13 are mounted rotatably and/or axially displaceably on the swinging fork element 2 via the two tensioning levers 10, 11. As already mentioned, the tensioning pulleys 12, 13 could also be mounted rotatably and/or axially displaceably on the frame of the motorcycle 1 via the two tensioning levers 10, 11, but this is not shown here.

In the variant shown in FIG. 1, the spring element 14 presses the two tensioning pulleys 12, 13 onto an outer side A of the pulling member 4 by means of the two tensioning levers 10, 11. The outer side A of the pulling member 4 faces away from the two gear elements 7, 8. The outer side A of the pulling member 4 in the form of a belt may also be referred to as the belt spine.

FIG. 2 substantially clarifies the contents of FIG. 1, and therefore only the differences will be discussed.

In the further variant shown in FIG. 2, the spring element 14 presses the two tensioning pulleys 12, 13 by means of the at least two tensioning levers 10, 11 onto an inner side I of the pulling member 4, on which inner side the pulling member 4 is in engagement with the two gear elements 7, 8. The inner side I of the pulling member 4 faces the gear elements 7, 8.

The first tensioning lever 10 comprises two lever regions 15, 16 which are connected to one another at a connecting region 19 and enclose an angle a with one another. The first tensioning lever 10 can generally be formed as a single part.

The second tensioning lever 11 comprises two lever regions 17, 18 which are connected to one another at a further connecting region 21 and likewise enclose an angle a with one another. The second tensioning lever 11 can generally be formed as a single part.

The two tensioning levers 10, 11 are mounted rotatably on the swinging fork element 2 at the respective connecting regions 19, 21 and at the bearing position 22.

At the respective connecting regions 19, 21, the tensioning levers 10, 11 can preferably be provided with friction elements, not shown further here, which can be configured, for example, as friction disks, in order to bring about a targeted friction and thereby damping during the rotation of the respective tensioning levers 10, 11 relative to one another.

The spring element 14 is coupled here to the respective tensioning levers 10, 11 at the lever regions 16, 18 and at a respective distance x from the connecting regions 19, 21.

In the case of the present motorcycle 1, a complicated concentric arrangement of the rotary bearing 3 and of the first gear element 7 and thus, for example, a coaxial arrangement of a swinging fork mounting, defined by the rotary bearing 3, of the swinging fork element 2 and a motor output shaft or transmission output shaft, which can be coupled to the first gear element 7 (here: belt pinion), can be dispensed with. Although respective distances between the first bearing point 20 of the first gear element 7 and the rotary bearing 3 and between the first bearing point 20 and the second bearing point (not shown) of the second gear element 8 may change because of pivoting movements of the swinging fork element 2 induced by the travel mode, the pulling member 4 (here: belt) can be cut uniformly tensioned permanently and independently of a load change by means of the tensioning device 9. Even if, by dispensing with the concentric arrangement of the rotary bearing 3 and of the first gear element 7, the change in the respective distances occurs as a result of the pivoting movements of the swinging fork element 2 about the pivot axis induced by the travel mode, possible pretensioning changes occurring because of a high rigidity of the pulling member 4 (changes in the pretensioning of the pulling member 4) can be effectively compensated for by means of the tensioning device 9. The tensioning device 9 therefore makes it possible to avoid states where the pretensioning of the pulling member 4 is too low and would threaten destruction of the pulling member 4, for example by skipping of respective teeth of a toothing of the pulling member 4. Furthermore, states where the pretensioning of the pulling member 4 is too high can also be avoided by the tensioning device 9, and therefore possible tearing of the pulling member 4 and, additionally or alternatively, a high shaft loading and bearing loading as a result of the pretensioning being too high can be prevented. Furthermore, the tensioning device 9 advantageously contributes to keep a variance in a tensioning of the pulling member 4 acoustically inconspicuous. This is in particular of advantage if the motorcycle 1 is driven electrically.

The tensioning device 9 which may also be referred to as a double-arm belt tensioner, permits uniform bracing of the pulling member 4 in mutually opposite load directions, i.e. both in the traction mode, which may also be referred to as the drive state, and in the thrust mode, which may also be referred to as the drag state. A change in length due to expansion of the pulling member 4 can be compensated for here in the mutually opposite load directions by the tensioning device 9.

With a suitable configuration of the spring element 14, the spring force F ensures the virtually constant pretensioning of the pulling member 4 on the slack side 5 even in the event of the changing distances between the first bearing point 20 of the first gear element 7 and the rotary bearing 3 and between the first bearing point 20 and the second bearing point (not shown) of the second gear element 8. By means of the rotatable mounting of the tensioning device 9 (double-arm belt tensioner), the pretensioning is independent of the load direction in the tensioning member 4, and therefore optimum tensioning of the slack side 5 is ensured even in the thrust mode or recuperation mode. In the event of load changes, the tensioning device 9 can correspondingly pivot around such that the load side 6 can be in each case approximately stretched.

In comparison to systems known from the prior art, the tensioning device 9 permits a simpler mounting of the swinging fork element 2 via the rotary bearing 3, the mounting being able to be positioned independently of drive motor or transmission output. At the same time, the small constant pretensioning makes it possible to achieve an increase in a respective service life of the pulling member 4 or respective bearings and an improvement in acoustics.

LIST OF REFERENCE SIGNS

1 Motorcycle
2 Swinging fork element
3 Rotary bearing
4 Pulling member
5 Slack side
6 Load side
7 Gear element
8 Gear element
9 Tensioning device
10 Tensioning lever
11 Tensioning lever
12 Tensioning pulley
13 Tensioning pulley
14 Spring element
15 First lever region
16 Second lever region
17 First lever region
18 Second lever region
19 Connecting region
20 First bearing point
21 Connecting region
22 Bearing position
a Angle
A Outer side
I Inner side
F Spring force
x Distance

What is claimed is:
1. A motorcycle, comprising
at least one swinging fork element configured to be coupled pivotably to a holding element of the motorcycle via a rotary bearing of the motorcycle;

at least one pulling member;
at least two gear elements; and
at least one tensioning device configured to tension the at least one pulling member,
wherein
the at least two gear elements are each spaced apart from the rotary bearing,
a first gear element of the at least two gear elements is mounted rotatably separately from the at least one swinging fork element, a second gear element of the at least two gear elements is arranged rotatably on the at least one swinging fork element,
the first gear element and the second gear element are each in engagement with the at least one pulling member and are coupled to each other in a torque-transmitting manner via the at least one pulling member,
the at least one tensioning device is mounted on the at least one swinging fork element or on a frame of the motorcycle such that the at least one tensioning device is rotatable, axially displaceable, or rotatable and axially displaceable relative to the at least two gear elements,
the at least one tensioning device includes at least two tensioning levers which are movable relative to one another,
the at least two tensioning levers meet one another at a connecting region,
the at least two tensioning levers each have at least two lever regions which meet at the connecting region,
the at least two lever regions of a first one of the at least two tensioning levers enclose a predetermined angle and the at least two lever regions of a second one of the at least two tensioning levers encloses the same predetermined angle,
at least one spring element configured to act upon the at least two tensioning levers with a spring force such that the at least two tensioning levers biased against the at least one pulling member, the at least one tensioning device
further includes at least two tensioning pulleys between the at least two gear elements,
each of the at least two tensioning pulleys is rotatably supported on a respective one of the at least two tensioning levers,
the at least two tensioning pulleys are configured to apply the spring force to the at least one pulling member, and
the at least one spring element presses the at least two tensioning pulleys, via the at least two tensioning levers, onto an inner side of the at least one pulling member that engages with the at least two gear elements.

2. The motorcycle according to claim 1, wherein the at least two tensioning levers are pivotable relative to one another or are displaceable in a translatory manner relative to one another.

3. The motorcycle according to claim 2, wherein the at least one tensioning lever of the at least two tensioning levers is mounted rotatably at the connecting region, and
the at least one spring element is connected to the at least one tensioning lever at one of the at least two lever regions and at a distance from the connecting region.

4. The motorcycle according to claim 1, wherein the at least one spring element is a helical spring.

5. The motorcycle according to claim 1, wherein the at least one pulling member is a belt.

6. A tensioning device for a motorcycle, comprising:
at least two tensioning levers which are movable relative to one another;
at least one spring element configured to act upon the at least two tensioning levers with a spring force; and
at least two tensioning pulleys,
wherein
each of the at least two tensioning pulleys is rotatably supported on a respective one of the at least two tensioning levers,
the at least two tensioning pulleys are configured to apply the spring force, via the at least two tensioning levers, against at least one pulling member when the tensioning device is in an installed position on the motorcycle to the at least one pulling member, the at least two tensioning levers
meet one another at a connecting region,
the at least two tensioning levers each have at least two lever regions which meet at the connecting region,
at least two lever regions of a first one of the at least two tensioning levers enclose a predetermined angle and the at least two lever regions of a second one of the at least two tensioning levers encloses the same predetermined angle, and
the at least two tensioning pulleys are arranged on the respective ones of the at least two tensioning levers, such that when the tensioning device is in the installed position on the motorcycle, the at least two tensioning pulleys press against an inner side of the at least one pulling member.

7. A motorcycle, comprising
at least one swinging fork element configured to be coupled pivotably to a holding element of the motorcycle via a rotary bearing of the motorcycle;
at least one pulling member;
at least two gear elements; and
at least one tensioning device configured to tension the at least one pulling member,
wherein
the at least two gear elements are each spaced apart from the rotary bearing,
a first gear element of the at least two gear elements is mounted rotatably separately from the at least one swinging fork element, a second gear element of the at least two gear elements is arranged rotatably on the at least one swinging fork element,
the first gear element and the second gear element are each in engagement with the at least one pulling member and are coupled to each other in a torque-transmitting manner via the at least one pulling member,
the at least one tensioning device is mounted on the at least one swinging fork element or on a frame of the motorcycle such that the at least one tensioning device is rotatable, axially displaceable, or rotatable and axially displaceable relative to the at least two gear elements,
the at least one tensioning device includes at least two tensioning levers which are movable relative to one another,
the at least two tensioning levers meet one another at a connecting region,
the at least two tensioning levers each have at least two lever regions which meet at the connecting region,
the at least two lever regions of a first one of the at least two tensioning levers enclose a predetermined angle and the at least two lever regions of a second one of the at least two tensioning levers encloses the same predetermined angle, at least one spring element configured to act upon the at least two tensioning levers with a spring force such that the at least two tensioning levers biased against the at least one pulling member, and the at least one spring element is a helical spring.

8. The motorcycle according to claim 7, wherein the at least one tensioning device further includes at least two tensioning pulleys between the at least two gear elements, each of the at least two tensioning pulleys is rotatably supported on a respective one of the at least two tensioning levers, and the at least two tensioning pulleys are configured to apply the spring force to the at least one pulling member.

9. The motorcycle according to claim 8, wherein the at least one spring element presses the at least two tensioning pulleys, via the at least two tensioning levers, onto an inner side of the at least one pulling member that engages with the at least two gear elements.

10. The motorcycle according to claim 8, wherein the at least two tensioning levers are pivotable relative to one another or are displaceable in a translatory manner relative to one another.

11. The motorcycle according to claim 10, wherein the at least one tensioning lever of the at least two tensioning levers is mounted rotatably at the connecting region, and the at least one spring element is connected to the at least one tensioning lever at one of the at least two lever regions and at a distance from the connecting region.

12. The motorcycle according to claim 7, wherein the at least one pulling member is a belt.

\* \* \* \* \*